US006928350B2

United States Patent
Melnyk et al.

(10) Patent No.: US 6,928,350 B2
(45) Date of Patent: Aug. 9, 2005

(54) CONTROL CONSOLE FOR AN AUTOMOBILE

(75) Inventors: Borys Joseph Melnyk, Allen Park, MI (US); Paul Allen Berneis, Dexter, MI (US); Jeff Matson, White Lake, MI (US); Oded M. Flascher, Farmington Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/273,725

(22) Filed: Oct. 18, 2002

(65) Prior Publication Data

US 2003/0105568 A1 Jun. 5, 2003

Related U.S. Application Data

(60) Provisional application No. 60/340,749, filed on Oct. 29, 2001.

(51) Int. Cl.[7] ............................... G05G 1/06; B41J 5/16
(52) U.S. Cl. ............................. 701/36; 701/1; 400/489; 700/17
(58) Field of Search .............................. 701/1, 36, 49; 400/473, 477, 489, 491; 74/473.3, 491, 492; 345/168; 341/20, 22, 23; 700/17; 200/296

(56) References Cited

U.S. PATENT DOCUMENTS

| 4,069,720 | A |   | 1/1978 | Thor ........................ 74/571 R |
| 4,650,934 | A |   | 3/1987 | Burke ........................ 200/5 R |
| 4,792,783 | A | * | 12/1988 | Burgess et al. ............. 307/10.1 |
| 5,472,156 | A |   | 12/1995 | Bivens, III et al. .......... 244/234 |
| 5,566,586 | A |   | 10/1996 | Lauer et al. ................... 74/523 |
| 5,790,101 | A |   | 8/1998 | Schoch et al. ............... 345/161 |
| 5,831,515 | A |   | 11/1998 | Stewart et al. ............ 340/384.4 |
| 5,916,288 | A | * | 6/1999 | Hartman ....................... 701/36 |
| 5,949,149 | A | * | 9/1999 | Shitanaka et al. .......... 307/10.1 |
| 6,148,593 | A |   | 11/2000 | Heinsey et al. ........... 56/10.2 R |
| 6,161,066 | A |   | 12/2000 | Wright et al. ................. 701/36 |
| 6,256,558 | B1 | * | 7/2001 | Sugiura et al. ................ 701/1 |
| 6,373,472 | B1 | * | 4/2002 | Palalau et al. ............... 345/173 |
| 2001/0021332 | A1 |   | 9/2001 | Boldy et al. ................. 400/489 |
| 2001/0034573 | A1 |   | 10/2001 | Morgan et al. ............... 701/36 |

FOREIGN PATENT DOCUMENTS

| EP | 0 217 497 | 7/1985 |
| GB | 2 068 719 | 1/1980 |
| GB | 1 594 536 | 7/1981 |
| GB | 2 119 067 | 11/1983 |

OTHER PUBLICATIONS

English Abstract of DE 10013054.
English Abstract of European Patent Application 0 217 497.

* cited by examiner

Primary Examiner—Tan Q. Nguyen
(74) Attorney, Agent, or Firm—Brinks Hofer Gilson & Lione

(57) ABSTRACT

A control device for controlling a plurality of user appliances is disclosed. The device is ergonomically designed to enforce hand placement and eliminate the problem of finding the correct switch to manipulate. Additionally, the controls on the device have software-defined functions, enabling the functions of a plurality of equipment to be managed from a single device. The device has a hand positioning portion having a first set of user actuatable switches for changing an operation of at least one of the plurality of user appliances. The hand positioning portion is configured to align a user's hand with the first set of user actuatable switches. Additionally, the device has a switch pad portion in juxtaposition with the hand positioning portion having a second set of user actuatable switches for changing an operation of at least one of another of the plurality of user appliances.

26 Claims, 4 Drawing Sheets

CONTROL CONSOLE FOR AN AUTOMOBILE

CROSS-REFERENCE TO RELATED APPLICATIONS

The present invention claims priority to U.S. Provisional Ser. No. 60/340,749 filed on Oct. 29, 2001, entitled "Control Pod For Emergency Vehicle Equipment."

TECHNICAL FIELD

The present invention relates to devices and methods for controlling a plurality of user appliances or equipment.

BACKGROUND

Emergency service vehicles today contain a large collection of electronic equipment such as, communication radios, warning lights, computers, video systems, radar, etc. The current state of the art is to provide a control head (containing switches, displays, etc.) for each piece of equipment. In rare cases a computer with a touch screen will control a set of devices. In the absence of a computer, the passenger compartment is cluttered with control heads, and often with the equipment itself since the control head is often integral with the equipment.

While the prior art achieves its intended purpose significant problems still exist. For example, the many devices and control heads occupy and compete for space within the passenger compartment of the vehicle. Additionally, the distribution and clutter created by the positioning of the devices within the vehicle creates an inefficient environment for the operator since the operator must search for the correct switch to activate each function.

However, if the vehicle is equipped with a computer, the touch screen is generally awkward since it is, typically, poorly placed (to avoid the airbag deployment zone). Moreover, the conventional screens provide no tactile feedback regarding control locations on the screen.

Therefore, there is a need for a new and improved device and method for controlling a plurality of user appliances. The new and improved device or method should be ergonomically designed to enforce hand placement and thus eliminate the problem of finding the correct switch. Additionally, the controls on the new and improved device should have software-defined functions, enabling the key functions of a plurality of equipment to be managed from a single device.

These and other aspects and advantages of the present invention will become apparent upon reading the following detailed description of the invention in combination with the accompanying drawings.

SUMMARY

In an embodiment of the present invention, a control device for controlling a plurality of user appliances is provided. The device is ergonomically designed to enforce hand placement and eliminate the problem of finding the correct switch to manipulate. Additionally, the controls on the device have software-defined functions, enabling the functions of a plurality of equipment to be managed from a single device. The device has a hand positioning portion having a first set of user actuatable switches for changing an operation of at least one of the plurality of user appliances. The hand positioning portion is configured to align a user's hand with the first set of user actuatable switches. Additionally, the device has a switch pad portion in juxtaposition with the hand positioning portion having a second set of user actuatable switches for changing an operation of at least one of another of the plurality of user appliances.

In another embodiment of the device, a display is provided for displaying system operation, in accordance with the present invention.

In yet another embodiment of the device, a control pod is provided mounted to the center console via an articulated arm, allowing it to be positioned conveniently for the driver of the vehicle, in accordance wit the present invention.

In another embodiment of the device, the hand positioning portion includes an elevated portion for accommodating a user's palm and has a padded member attached to the hand positioning portion to accommodate a user's arm.

In accordance with another aspect of the invention, the device has a host computer in communication with the actuatable switches and the user appliances and has a display for displaying system operations. The display is located in the switch pad portion.

In accordance with yet another aspect of the invention, the plurality of user appliances includes at least one of a warning light, a siren, a radio, a computer, and a radar. The hand positioning portion includes depressions to align the user's hand with the first set of actuatable switches and is at least one of push button switches, slide switches, toggle switches, and knobs.

Another embodiment of the present invention, a control system for a vehicle has a plurality of user appliances is provided. The control system has a moveable shaft having first and second ends, the first end being affixed to the vehicle and a control console having a generally planar surface. Additionally, the surface includes a first portion, a second portion, and a third portion, the first portion having depressions for accommodating fingers of a user, the second portion being elevated slightly above the planar surface for accommodating a user's palm, and the third portion having a plurality of actuators for controlling the user appliances. The control console is attached to the second end of the moveable shaft enabling the control console to be positioned relative to the user.

In another embodiment of the control system, a padded member attached to the control console accommodates a user's arm. The system includes a host computer in communication with the control console and the user appliances and has a display for displaying system operations. The display is located in the third portion and the control console is located between a passenger seat and a driver seat.

In yet another embodiment of the control system, the plurality of user appliances includes at least one of a warning light, a siren, a radio, a computer, and a radar. A moveable shaft is attached to the vehicle with a ball and socket. The control console is attached to the moveable shaft with a ball and socket. The system includes depressions in the upper portion include actuators for controlling the user appliances. The actuators are at least one of push button switches, slide switches, toggle switches, and knobs.

In yet another embodiment of the present invention, a control console includes a first portion having a generally planar top surface, the surface having depressions for accommodating fingers of a user. The consoled includes a second portion having a top surface elevated slightly above the generally planar surface of the first portion for accommodating a palm of the user and a third portion having a generally planar top surface, the surface having a plurality of actuators for controlling a plurality of user appliances.

In still another embodiment of the present invention includes a control console having a padded member attached to the third portion to accommodate a user's arm. The control console includes a display for displaying system operations. The display is located in the third portion.

In another embodiment of the control console, the plurality of user appliances includes at least one of a warning light, a siren, a radio, a computer, and a radar. Depressions in the first portion include actuators for controlling the user appliances. The actuators are at least one of push button switches, slide switches, toggle switches, and knobs.

In yet another embodiment of the present invention, a control device for controlling a plurality of user appliances from a single location includes a hand positioning portion having a first set of user actuatable switches for changing an operation of at least one of the plurality of user appliances, wherein the hand positioning portion is configured to align a user's hand with the first set of user actuatable switches. The switch pad portion in juxtaposition with the hand positioning portion includes a second set of user actuatable switches for changing an operation of at least one of another of the plurality of user appliances.

These and other aspects and advantages of the present invention will become apparent upon reading the following detailed description of the invention in combination with the accompanying drawings.

DETAILED DESCRIPTION

Figure 1:
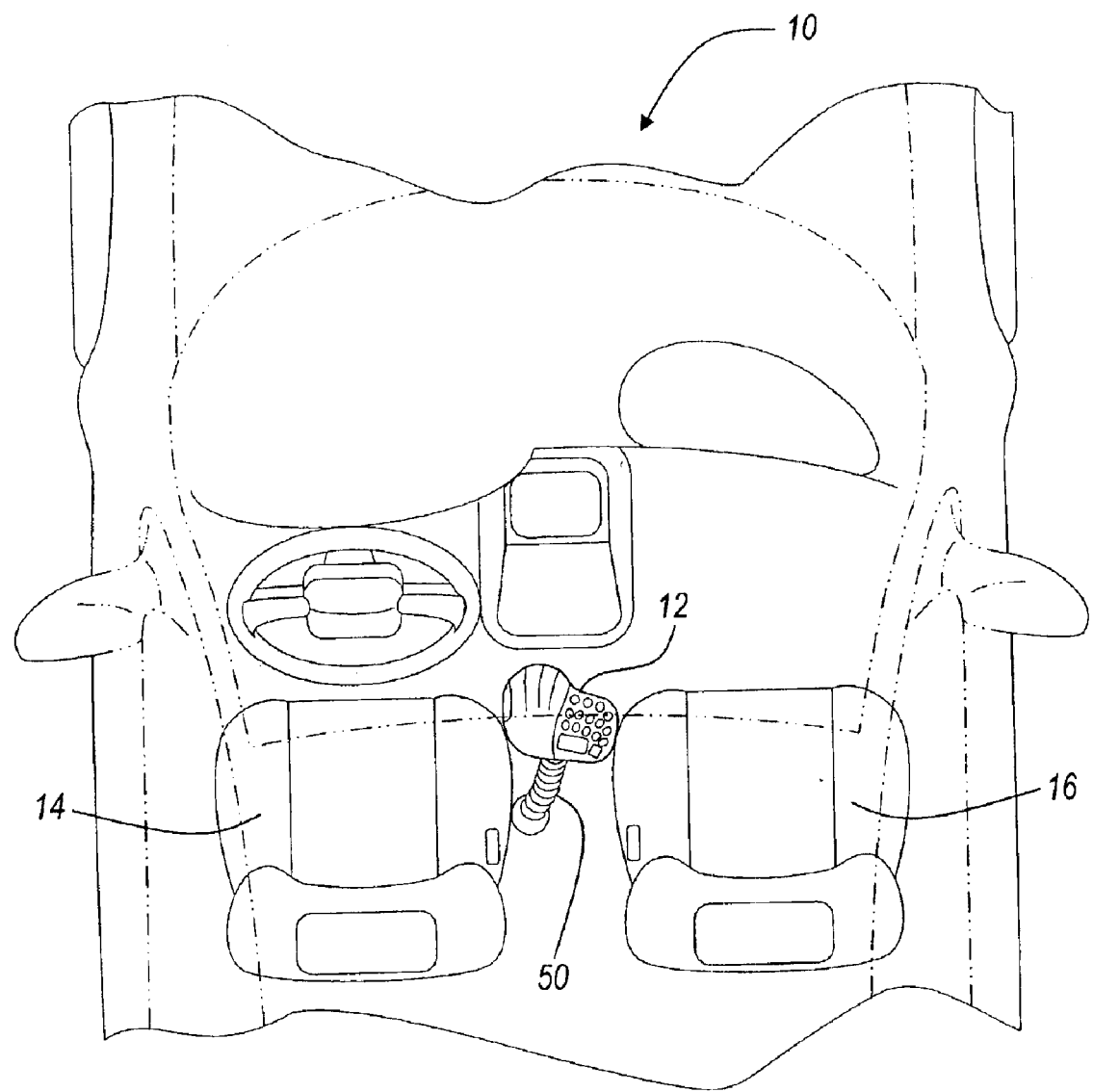
FIG. 1 is a plan view of a vehicle having a control pod for controlling a plurality of user appliances from a single location, in accordance with the present invention.

With reference to FIG. 1, a vehicle 10 having a control console or pod 12 is illustrated, in accordance with the present invention. The control pod 12 is generally positioned between a driver 14 and passenger seat 16. An operator of vehicle 10 or a passenger may use control pod 12 to active, manipulate, and/or adjust the operation of a plurality of user appliances 18 (see FIG. 2) located within or on vehicle 10. In an embodiment of the present invention control pod 12 is located in an emergency vehicle such as, a police cruiser or fire department vehicle.

Figure 2:
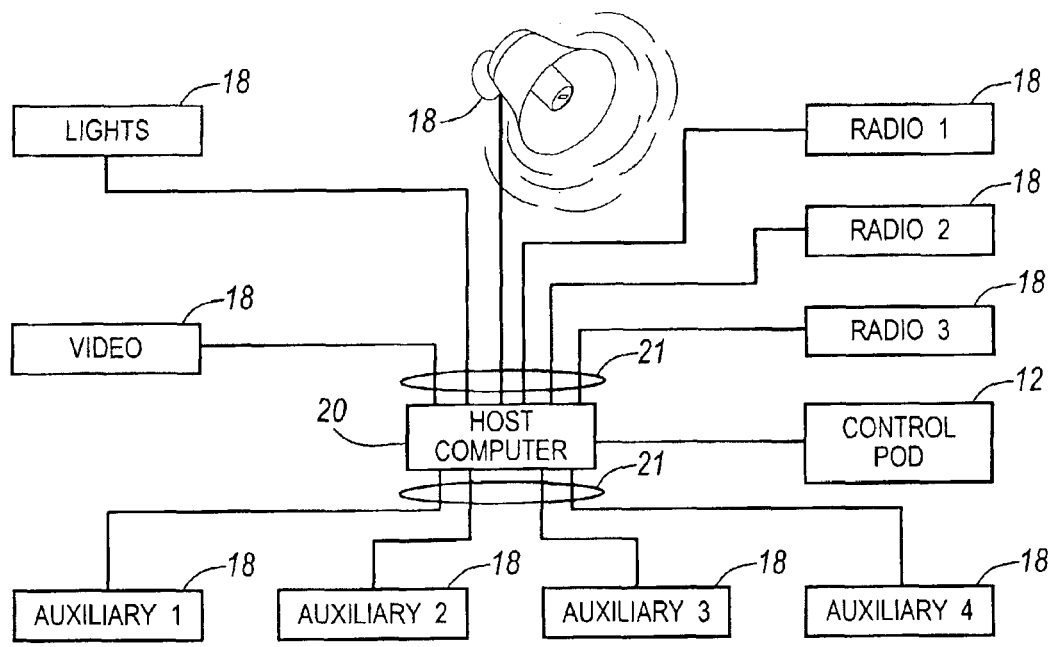
FIG. 2 is a schematic diagram of system having a plurality of user appliances connected to a control pod for controlling the appliances from a single location, in accordance with the present invention.
Figure 3:
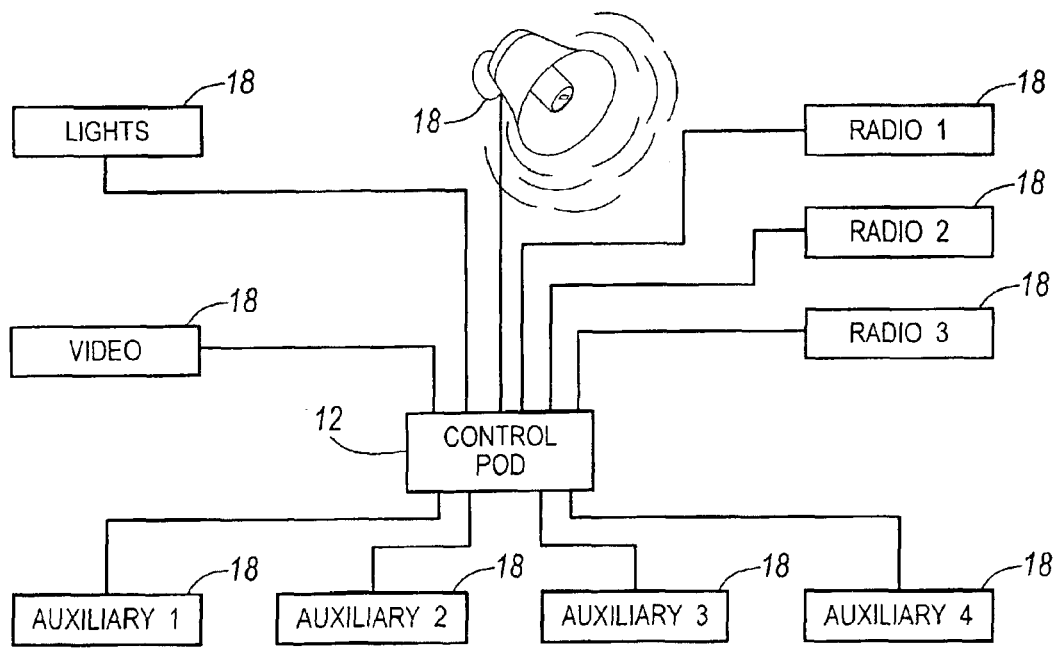
FIG. 3 is a schematic diagram of system having a plurality of user appliances connected to a host computer that is in communication with a control pod for controlling the appliances from a single location, in accordance with the present invention.

Pod 12 may interface to a host computer 20 that communicates control signals to the plurality of user appliances 18 (as illustrated in FIG. 2), or pod 12 may communicate directly with the plurality of user appliances 18, as illustrated in FIG. 3. Preferably control pod 12 communicates with host computer 20 or directly with appliances 18 through a network interface 21 (e.g., CAN Network).

In an alternative embodiment of the present invention, pod 12 interfaces to host computer 20 through individual signal lines for each control or via a resistor ladder, among other ways.

In an emergency vehicle environment, appliances 18 may include radios, horns or sirens, light bars, video cameras, and other emergency equipment, for example.

Figure 4:
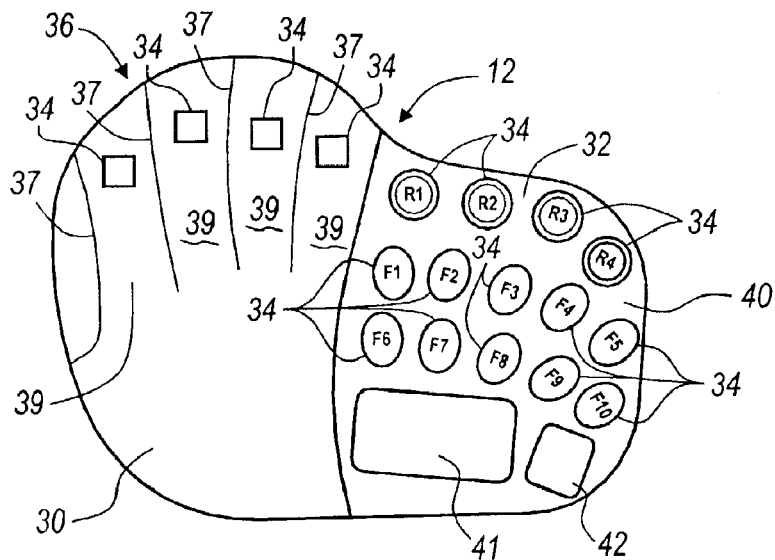
FIG. 4 is a plan view of a control pod for controlling a plurality of user appliances from a single location, in accordance with the present invention.

As illustrated in FIG. 4, control pod 12 has a hand positioning portion 30 and a switch panel portion 32. The hand positioning portion 30 of control pod 12 has of a set of controls 34 integrated into a capsule 36. Capsule 36 is formed or configured to facilitate positions of an operator's hand to easily manipulate controls 34. More specifically, capsule 36 includes a plurality of ribs 37 that define finger placement portion 39. The controls 34 in the hand positioning portion 30, finger placement portion 39 and in switch panel portion 32 include both input and output devices including, but not limited to pushbutton switches, slide switches, toggle switches, rotary encoders, light emitting diodes (LEDs), potentiometers, and haptic knobs. Further, a small liquid crystal display 41 (LCDs), and fingerprint reader 442 are provided in switch panel portion 32. LCD 41 is capable of displaying text or graphics related to system operation information as well as appliance operation information. For security purposes and to limit access to the operation of control pod 12, a biometric identification device 42 is provided such as a thumb or fingerprint reader for screening potential users of pod 12. A fingerprint reader may be of the type offered by Siemens Ag. of Munich, Germany or a fingerprint reader offered by Applied Biometrics Corp.

In operation, the user places his or her hand on pod 12 (normally the right hand in a U.S. vehicle) the contours of hand positioning portion 30 and ribs 37 of pod 12 naturally position an operator's fingers next to a consistent set of controls 343. Additional controls 34 residing on switch panel portions 32 are easily found by an operator when the operator moves their hand a fixed distance offset from the hand positioning portion 30, using a surface 40 of pod 12 as a guide.

In an embodiment of the present invention application software is provided that is executable on host computer 20 or directly on control pod 12. The application software defines the purpose of each control and manages the device. This allows the function of each control 34 to be changed as needed, without affecting the pod confirmation.

Figure 6:
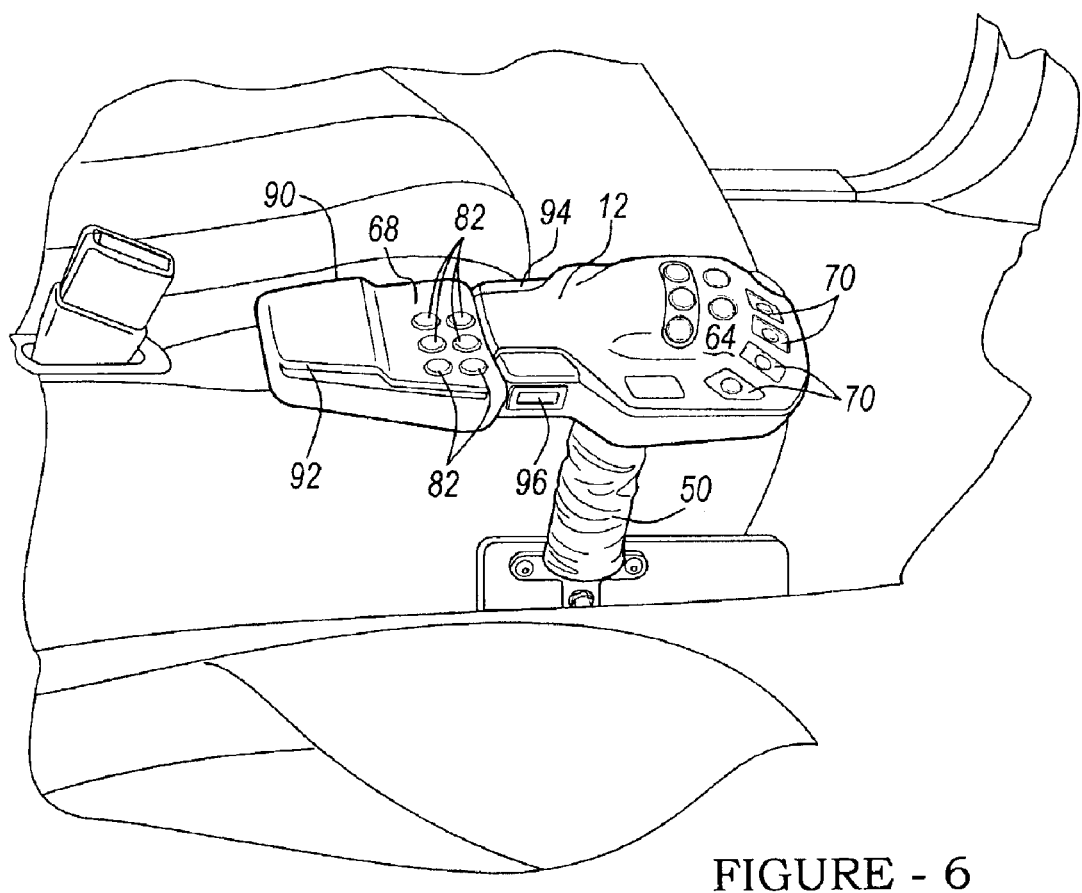
FIG. 6 is a side view of a control pod, in accordance with the present invention.

The present invention contemplates mounting pod 12 to an articulating arm 50 having a ball and socket joint, as shown in FIGS. 1 and 6. The arm 50 allows pod 12 to be positioned so that the user's hand naturally drops into position to use the pod 12. This mounting scheme will allow pod 12 to be located outside of the airbag deployment zone, but otherwise allow considerable freedom in positioning and orienting pod 12 adjacent an operator. This flexibility is the direct result of separating the controls from the equipment they control and using a single pod 12 to control multiple pieces of equipment, both features of the present invention free up critical space in the passenger compartment.

Figure 5:
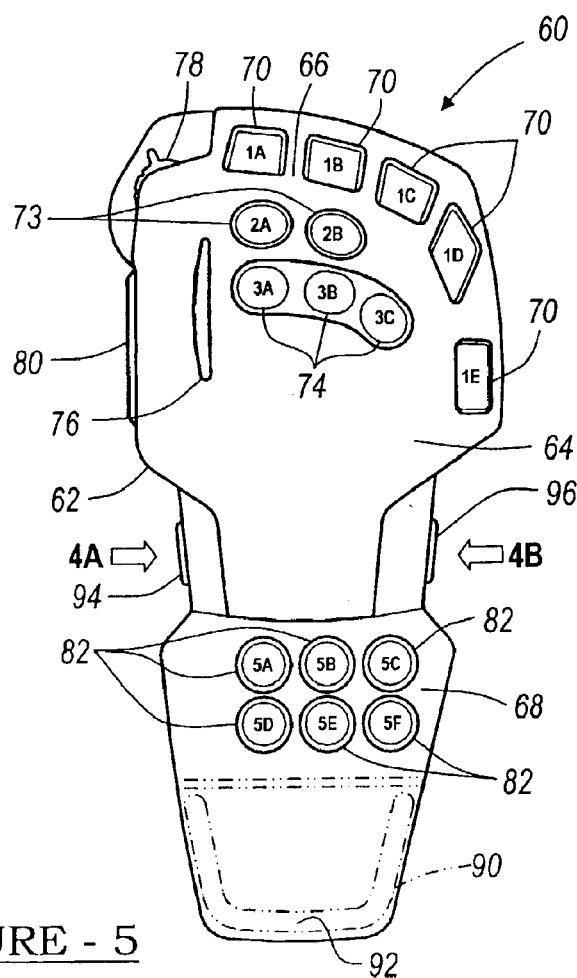
FIG. 5 is a plan view of an alternative embodiment of the control pod, in accordance with the present invention.

Referring now to FIG. 5, a plan view of an alternative embodiment of a control pod 60 of the present invention is illustrated. Control pod 60 includes a generally planar longitudinal body 62 having a top surface 64. Top surface 64 generally includes two areas or portions, a hand positioning portion 66 and a switch pad portion 68. Hand positioning portion 66 is configured to facilitate the placement of an operator's fingers along a series of controls or actuators 70 disposed on top surface 64. Controls 70 are recessed into surface 64 to further align the fingers of an operator's hand with the controls. Controls 70 establish a first row of controls along a periphery of control pod 60. A second row of controls 72 are positioned inward of controls 70 and are easily locatable by an operator once the operator has positioned their fingers on controls 70. Similarly, a third row of controls 74 are positioned a fixed distance from controls 72 and likewise are easily locatable by a vehicle operator since they are a fixed distance from controls 70.

Other actuators are further provided on control pod 60 providing additional control functions to an operator. For example, a voice command pushed to talk actuator 76 is disposed on top surface 64 adjacent controls 70, 72 and 74. Further, as illustrated in FIGS. 5 and 6, the side surfaces of control pod 60 may incorporate additional controls such as a rotary switch control 78 and a push button control 80.

The switch pad portion 68 located proximate to hand positioning portion 66 similarly includes a plurality of switches or buttons 82. Generally, buttons 82 are arranged in rows along top surface 64 for convenient access by an operator. While two rows of three buttons are illustrated, the present invention contemplates the use of additional rows and buttons as well as buttons having different shapes and configurations.

In yet another embodiment of the present invention, control pod 60 includes an arm rest portion 90 fixed to control pod 60 and positioned adjacent switch pad portion 68. Arm rest portion 90 includes a raised cushion 92 that provide a comfortable surface on which an operator may rest their arm. The present invention contemplates use of cushions 92 configured to guide an operator's arm along a parallel orientation with respect to a longitudinal axis of control pod 60.

Control pod 60 as well as the previous control pod embodiment (control pod 12) may be configured for use in emergency vehicles such as a police cruiser. An example of the type of controls as well as the control functions associated with the actuators and buttons for the emergency vehicle environment will now be described. Control 70 may include push buttons having various functions for actuating an air-horn and various lights and sirens. Control 72 may also be push buttons and may control the operation of the sirens and lights. Further, control 74 may be assigned to radio functions. Rotary dial 68 may, for example, control the volume of the in-vehicle audio system. Additionally, a pair of actuators 94 and 96 may be located at an intermediate location along longitudinal member 62. Further, this intermediate location may have a reduced cross-section to facilitate locating actuator 94 and 96. Actuator's 94 and 96 may be assigned a function of higher importance such as emitting emergency beacon or powering down all vehicle lights.

With respect to switch pad portion 68, the plurality of controls 82 may be reconfigured depending on the selection of a particular mode. For instance, in a police cruiser, there may be a video mode, a screen navigation mode, a radar mode, and a lights mode, depending on the particularly mode selected, the operation and function of that system selected may be manipulated. For example, if the video mode is selected the in controls 82 may operate various video functions such as reverse, play, fast forward, stop, record and pause. If the screen navigation mode is selected, functions related to screen navigation may be assigned to the various controls 82, such as, back, up arrow, enter, left arrow, down arrow, and right arrow. Further, if a radar mode is selected, controls 82 may be assigned to various radar control functions such as moving, front, monitor, stationary, rear, and transmit functions. Likewise, if a lights mode is selected, various functions related to the vehicle lights may be assigned to the various control actuators 82, such as, jog left, off, jog right, left alley, take down, and right alley.

As any person skilled in the art of devices for controlling a plurality of user appliances or equipment will recognize from the previous detailed description and from the figures and claims, modifications and changes can be made to the preferred embodiments of the invention without departing from the scope of this invention defined in the following claims.

What is claimed is:

1. A control device for controlling a plurality of user appliances from a single location, the device comprising:
   a hand positioning portion having a first set of user actuatable switches for changing an operation of at least one of the plurality of user appliances, wherein the hand positioning portion is configured to align a user's hand with the first set of user actuatable switches:
   a switch pad portion proximate to the hand positioning portion having a second set of user actuatable switches for changing an operation of at least one of another of the plurality of user appliances; and
   an arm rest portion for supporting the user's arm and having a third set of user actuatable switches for controlling the operation of at least one of another of the plurality of user appliances.

2. The device of claim 1, wherein the hand positioning portion includes a slightly elevated portion for accommodating a user's palm.

3. The device of claim 1, further comprising a host computer in communication with the actuatable switches and the user appliances.

4. The device of claim 3, wherein the display is located in the switch pad portion.

5. The device of claim 1, further comprising a display for displaying system operations.

6. The device of claim 1, wherein the plurality of user appliances includes at least one of a warning light, a siren, a radio, a computer, and a radar.

7. The device of claim 1, wherein the hand positioning portion includes depressions to align the users hand with the first set of actuatable switches.

8. The device of claim 1, wherein the actuatable switches are at least one of push button switches, slide switches, toggle switches, and knobs.

9. A control system for a vehicle, the system comprising:
   a plurality of user appliances;
   a moveable shaft having first and second ends, the first end being affixed to the vehicle; and
   a control console having a generally planer surface, wherein the surface includes a first portion, a second portion and a third portion and a fourth portion, the first portion having depressions for accommodating fingers of a user, the second portion being elevated above the planar surface for accommodating a users palm, the third portion having a first plurality of actuators for controlling the user appliances, and the fourth portion for supporting the user's arm and having a second plurality of actuators for controlling the user appliances;
   and wherein the control console is attached to the second end of the moveable shaft enabling the control console to be positioned relative to the user.

10. The control system of claim 9, further comprising a biometric identification device.

11. The control system of claim 10, wherein the biometric identification device as a fingerprint reader.

12. The system of claim 9, further comprising a host computer in communication with the control console and the user appliances.

13. The system of claim 9, further comprising a display for displaying system operations.

14. The system of claim 13, wherein the display is located in the third portion.

15. The system of claim 9, wherein the control console is located between a passenger seat and a driver seat.

16. The system of claim 9, wherein the plurality of user appliances includes at least one of a warning light, a siren, a radio, a computer, and a radar.

17. The system of claim 9, wherein the moveable shaft is attached to the vehicle with a ball and socket.

18. The system of claim 9, wherein the control console is attached to the moveable shaft with a bail and socket.

19. The system of claim 9, wherein the depressions in the upper portion include actuators for controlling the user appliances.

20. The system of claim 19, wherein the actuators are at least one of push button switches, slide switches, toggle switches, and knobs.

21. A control console comprising:
- a first portion having a generally planar top surface, the surface having depressions for accommodating fingers of a user;
- a second portion having a top surface elevated above the generally planar surface of the first portion for accommodating a palm of the user;
- a third portion having a generally planar top surface, the surface having a plurality of actuators for controlling a plurality of user appliances; and
- a fourth portion having a plurality of actuators and a cushion wherein the fourth portion is attached to the third portion for supporting the users arm.

22. The control console of claim 21, further comprising a display for displaying system operations.

23. The control console of claim 21, wherein the display is located in the third portion.

24. The control console of claim 21, wherein the plurality of user appliances includes at least one of a warning light, a siren, a radio, a computer, and a radar.

25. The control console of claim 21, wherein the depressions in the first portion include actuators for controlling the user appliances.

26. The control console of claim 21, wherein the actuators are at least one of push button switches, slide switches, toggle switches, and knobs.

* * * * *